US012802648B2

(12) United States Patent
Chung et al.

(10) Patent No.: US 12,802,648 B2
(45) Date of Patent: Nov. 17, 2026

(54) DISPLAY PANEL

(71) Applicant: LG Display Co., Ltd., Seoul (KR)

(72) Inventors: Moon Soo Chung, Paju-si (KR); Woo Kyu Sang, Paju-si (KR); Tae Hun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/283,626

(22) Filed: Jul. 29, 2025

(65) Prior Publication Data

US 2026/0045226 A1 Feb. 12, 2026

(30) Foreign Application Priority Data

Aug. 6, 2024 (KR) ........................ 10-2024-0104591

(51) Int. Cl.
*G09G 3/3266* (2016.01)

(52) U.S. Cl.
CPC ... *G09G 3/3266* (2013.01); *G09G 2310/0245* (2013.01); *G09G 2320/0233* (2013.01); *G09G 2320/0247* (2013.01); *G09G 2330/022* (2013.01)

(58) Field of Classification Search
CPC ......... G09G 3/3266; G09G 2310/0245; G09G 2320/0233; G09G 2320/0247; G09G 2330/022
See application file for complete search history.

(56) References Cited

U.S. PATENT DOCUMENTS

2020/0082768 A1* 3/2020 Oh ........................ G09G 3/3291
2022/0173189 A1* 6/2022 Kim ........................ G09G 3/325
2024/0185783 A1* 6/2024 Kim ........................ G09G 3/32

* cited by examiner

*Primary Examiner* — Lixi C Simpson
(74) *Attorney, Agent, or Firm* — Seed Intellectual Property Law Group LLP

(57) ABSTRACT

A display device includes a display panel including at least one pixel, an EM driver configured to generate an emission control signal of a multi-pulse type multi-toggled in one frame and supply the emission control signal to the at least one pixel, and a scan driver configured to generate a scan signal turned on in at least one off period included in the emission control signal, and supply the scan signal to the at least one pixel, so as to apply an on-bias stress (OBS) voltage to one electrode of the driving transistor and reset the light emitting element.

17 Claims, 13 Drawing Sheets

DISPLAY PANEL

CROSS-REFERENCE TO RELATED APPLICATIONS

This application claims the benefit of the Korean Patent Application No. 10-2024-0104591 filed on Aug. 6, 2024, which is hereby incorporated by reference as if fully set forth herein.

BACKGROUND

Technical Field

The present disclosure relates to a display device.

Description of the Related Art

Display apparatuses include a plurality of pixels arranged as a matrix type and implement luminance corresponding to image data by using the pixels. In display devices, technology where a refresh rate varies based on an attribute of an image has been known. Variable refresh rate (VRR) technology increases a data refresh cycle as a variation of an image is reduced, and thus, decreases power consumption.

Moreover, various driving methods for decreasing power consumption are being applied to display devices. As an example of the various driving methods, EM duty driving for controlling a turn-on time at a certain duty in one frame has been proposed.

BRIEF SUMMARY

The present disclosure may provide a display device which may decrease a variation width of a high-level pixel power in EM off periods when performing EM duty driving and may thus increase image quality.

As embodied and broadly described herein, a display device includes: a display panel including at least one pixel including a driving transistor configured to generate a driving current and a light emitting element configured to emit light with the driving current; an EM driver configured to generate an emission control signal of a multi-pulse type multi-toggled in one frame and supply the emission control signal to the at least one pixel, so as to turn on or off light-emission of the light emitting element; and a scan driver configured to generate a scan signal turned on in at least one off period included in the emission control signal, and supply the scan signal to the at least one pixel, so as to apply an on-bias stress (OBS) voltage to one electrode of the driving transistor and reset the light emitting element, wherein the emission control signal includes a first pulse cycle and a second pulse cycle which are continued in the one frame, a first off period of a first pulse width and a first on period of a second pulse width are continued in the first pulse cycle, and a second off period of a third pulse width which is less than the first pulse width and a second on period of a fourth pulse width which is greater than the second pulse width are continued in the second pulse cycle.

In another aspect of the present disclosure, a display device includes: a display panel including at least one pixel including a driving transistor configured to generate a driving current and a light emitting element configured to emit light with the driving current; an EM driver configured to generate an emission control signal of a multi-pulse type multi-toggled in one frame and supply the emission control signal to the at least one pixel, so as to turn on or off light-emission of the light emitting element; and a scan driver configured to generate a scan signal turned on in at least one off period included in the emission control signal, and supply the scan signal to the at least one pixel, so as to apply an on-bias stress (OBS) voltage to one electrode of the driving transistor and reset the light emitting element, wherein the emission control signal includes a first pulse cycle and a second pulse cycle which are continued in the one frame, a first off period of a first pulse width and a first on period of a second pulse width are continued in the first pulse cycle, a second off period of the first pulse width and a second on period of the second pulse width are continued in the second pulse cycle, and the first pulse width is less than the second pulse width.

In another aspect of the present disclosure, a display device includes: a display panel including at least one pixel including a driving transistor configured to generate a driving current and a light emitting element configured to emit light with the driving current; an EM driver configured to generate an emission control signal of a multi-pulse type multi-toggled in one frame and supply the emission control signal to the at least one pixel, so as to turn on or off light-emission of the light emitting element; and a scan driver configured to generate a scan signal turned on in at least one off period included in the emission control signal, and supply the scan signal to the at least one pixel, so as to apply an on-bias stress (OBS) voltage to one electrode of the driving transistor and reset the light emitting element, wherein the emission control signal includes K (where K is a natural number) of X pulse cycles having a first length during a first frame and J (where J is a natural number of less than K) of Y pulse cycles having a second length differing from the first length during a second frame succeeding the first frame.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
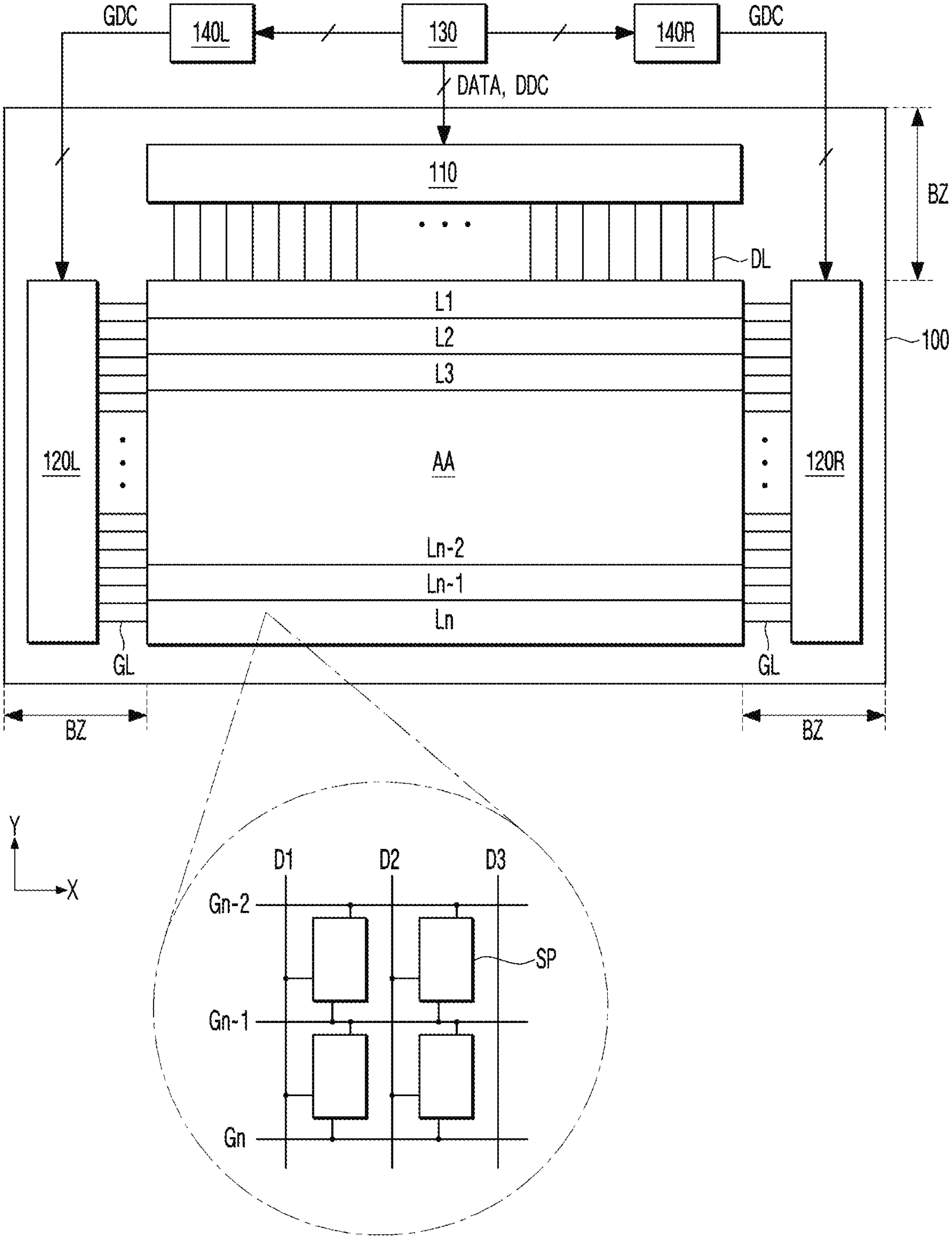
FIG. 1 is a diagram illustrating a display device according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms “comprise”, “having,” “including” and the like suggest that other parts can be added unless the term “only” is used. As used herein, the singular forms “a”, “an”, and “the” are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as “on~”, “over~”, “under~”, and “next~”, one or more other parts may be disposed between the two parts unless “just” or “direct” is used.

It will be understood that, although the terms “first”, “second”, etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram illustrating a display device according to an embodiment of the present disclosure.

Referring to FIG. 1, the display device according to an embodiment of the present embodiment may be an organic light emitting display device, but is not limited thereto. A display panel 100 may include an active area AA which reproduces an input image. The active area AA may include a pixel array which displays pixel data (hereinafter referred to as “image data”) DATA of an input image. The pixel array may include a plurality of data lines DL, a plurality of gate lines GL intersecting with the data lines DL, and a plurality of pixels SP.

The pixels SP may be arranged on the active area AA in a matrix type defined by intersections between the data lines DL and the gate lines GL. The pixels SP may be arranged as various types such as a stripe type and a diamond type on the active area AA, based on positions of the pixels SP emitting lights of the same color.

The pixel array may include a plurality of pixel columns and a plurality of pixel lines L1 to Ln intersecting with the pixel columns. Each of the pixel columns may include pixels SP which are arranged in a Y-axis direction. A pixel row may include pixels SP which are arranged in an X-axis direction. One vertical period may be one frame period needed for writing image data DATA of one frame in all pixels of the active area. One horizontal period may be a time obtained by dividing one frame period by the number of pixel lines L1 to Ln. One horizontal period may be a time needed for writing the image data DATA of one pixel line, sharing a gate line GL, in pixels SP of one pixel line.

The pixels SP may include a first pixel which generates red (R) light, a second pixel which generates green (G) light, and a third pixel which generates blue (B) light, for various color combinations. The pixels SP may further include a fourth pixel which generates white (W) light. The first to third pixels or the first to fourth pixels may configure one unit pixel.

Each of the pixels SP may be implemented with a pixel circuit connected to a data line DL and a gate line GL. The pixel circuit may include a light emitting element, a driving transistor, one or more switch transistors, and a capacitor. The light emitting element may be implemented as an organic light emitting diode (OLED). A driving current applied to the light emitting element may be controlled based on a gate-source voltage of the driving transistor. The gate-source voltage of the driving transistor may be determined by a data voltage corresponding to the image data DATA. In FIG. 1, “D1 to D3” illustrated in a circle may be data lines, and “Gn-2 to Gn” may be gate lines. Each of the pixels SP of FIG. 1 may be further connected to a front-end gate line as well as a current-end gate line. For example, each of pixels SP disposed in an $n^{th}$ pixel line Ln may be connected to a front-end gate line Gn-1 as well as an $n^{th}$ gate line Gn.

The pixel circuit may sample a threshold voltage of the driving transistor in the middle of a pixel programming operation which is performed in one frame period and may allow a sampled threshold voltage to be reflected in a gate-source voltage (hereinafter referred to as Vgs) of the driving transistor, and thus, may prevent a driving current from being distorted due to a threshold voltage variation of the driving transistor.

The pixel circuit may be implemented as a hybrid type. In a hybrid-type pixel circuit, semiconductor layers of some transistors may include low-temperature polycrystalline silicon (hereinafter referred to as LTPS), and semiconductor layers of the other transistors may be configured with oxide.

The pixel circuit may be driven based on variable refresh rate (VRR) technology. To implement the VRR variable technology, one or more skip frames may be provided between adjacent refresh frames. A refresh rate (i.e., a frame frequency) may be determined based on the number of skip frames provided between adjacent refresh frames.

A data refresh operation including pixel initialization and data programming may be performed in a refresh frame. The light emitting element may be turned off when performing a data refresh operation, and at this time, an anode reset operation where the light emitting element is initialized into an anode reset voltage may be performed.

A data refresh operation on the pixels SP may be omitted (or skipped) in a skip frame, and a data refresh condition (Vgs, the driving current, etc.) which is set in a refresh frame may be maintained. An anode reset operation for turning off the light emitting element may be performed in the skip frame. Accordingly, a time length where the light emitting element is turned on in the skip frame may be substantially equal to a time length where the light emitting element is turned on in the refresh frame.

In each of the refresh frame and the skip frame, while the anode reset operation is being performed, an on-bias stress (OBS) operation may be performed on the driving transistor.

In the hybrid-type pixel circuit according to the present embodiment, the OBS operation may be for preventing an image quality defect caused by a hysteresis characteristic of the driving transistor. When a grayscale value of the image data DATA is changed from black to white, a grayscale response time may increase in a first frame where a white image is reproduced, due to a time needed for varying the hysteresis characteristic of the driving transistor, and thus, a dim first frame (DFF) phenomenon may occur. At this time, when the Vgs of the driving transistor increases by applying an OBS voltage to one electrode of the driving transistor, a DFF characteristic may be alleviated. This may be referred to as an OBS operation.

Touch sensors may be further disposed on the display panel 100. The touch sensors may be arranged as an on-cell or add-on type on the active area AA of the display panel 100, or may be implemented as in-cell type touch sensors embedded in the pixel array. A touch input may be sensed through only the pixels SP even without the touch sensors, and in this case, the touch sensors may be omitted.

A display panel driver may include a source driver 110 and gate drivers 120L and 120R. The display panel driver may write the image data DATA in the pixels SP of the display panel 100, based on control by a timing controller 130.

A source driver 110 may convert the image data DATA, received from the timing controller 130, into gamma compensation voltages by using a digital-to-analog converter (DAC) to generate data voltages. The source driver 110 may supply the data voltages to the data lines DL. The data voltages may be supplied to the data lines DL and may be applied to gate electrodes of the driving transistors through the switch transistors of the subpixels SP. The source driver 110 may be implemented with a plurality of source drive integrated circuits (ICs).

To reduce an RC delay deviation occurring in the display panel 100 including a large active area, the gate drivers 120L and 120R may be implemented as a double bank type. That is, the gate drivers 120L and 120R may be provided as a gate driver in panel (GIP) type in left and right bezel areas BZ disposed outside the active area AA of the display panel 100 and may supply gate signals having the same phase to the same gate line GL at both sides of the display panel 100. The gate drivers 120L and 120R may include a first-side gate driver 120L which is disposed in the left bezel area BZ of the display panel 100 and a second-side gate driver 120R which is disposed in the right bezel area BZ of the display panel 100.

The gate drivers 120L and 120R at both sides may sequentially supply a gate signal to the gate lines GL, based on control by the timing controller 130. The gate signal may select pixel rows L1 to Ln charged with data voltages and may simultaneously activate pixels SP disposed in corresponding pixel rows L1 to Ln. The gate drivers 120L and 120R may output a gate signal needed for pixel driving and may shift the gate signal by pixel row units. The gate signal may include a plurality of scan signals which swing between an on level and an off level and an emission control signal. The gate drivers 120L and 120R at both sides may include a plurality of scan drivers which generate a plurality of scan signals and an EM driver which generates an emission control signal.

The timing controller 130 may receive video data DATA and a timing signal, synchronized with the video data DATA, from a host system (not shown). The timing signal may include a vertical synchronization signal Vsync, a horizontal synchronization signal Hsync, a clock signal DCLK, and a data enable signal DE. The vertical synchronization signal Vsync may define a vertical period. The horizontal synchronization signal Hsync may define a horizontal period. The data enable signal DE may define a time where the video data DATA is transferred, in a vertical period or a horizontal period. The vertical period and the horizontal period may be determined by a method of counting the data enable signal DE, and thus, the vertical synchronization signal Vsync and the horizontal synchronization signal Hsync may be omitted.

The timing controller 130 may generate a source timing control signal DDC for controlling an operation timing of the source driver 110 and a gate timing control signal GDC for controlling an operation timing of the gate drivers 120L and 120R, based on the timing signal Vsync, Hsync, and DE received from the host system.

The host system may be one of a television (TV), a set-top box, a navigation system, a personal computer (PC), a home theater, an automotive display system, a mobile device, and a wearable device. In the mobile device and the wearable device, the source driver 110, the timing controller 130, and level shifters 140L and 140R may be integrated into one drive IC.

The level shifters 140L and 140R may convert a voltage of the gate timing control signal GDC, output from the timing controller 130, into an on-level voltage and an off-level voltage and may supply the on-level voltage and the off-level voltage to the gate drivers 120L and 120R.

The level shifters 140L and 140R may include a first level shifter 140L which is connected to the first-side gate driver 120L through first signal lines and a second level shifter 140R which is connected to the second-side gate driver 120R through second signal lines.

Figure 2:
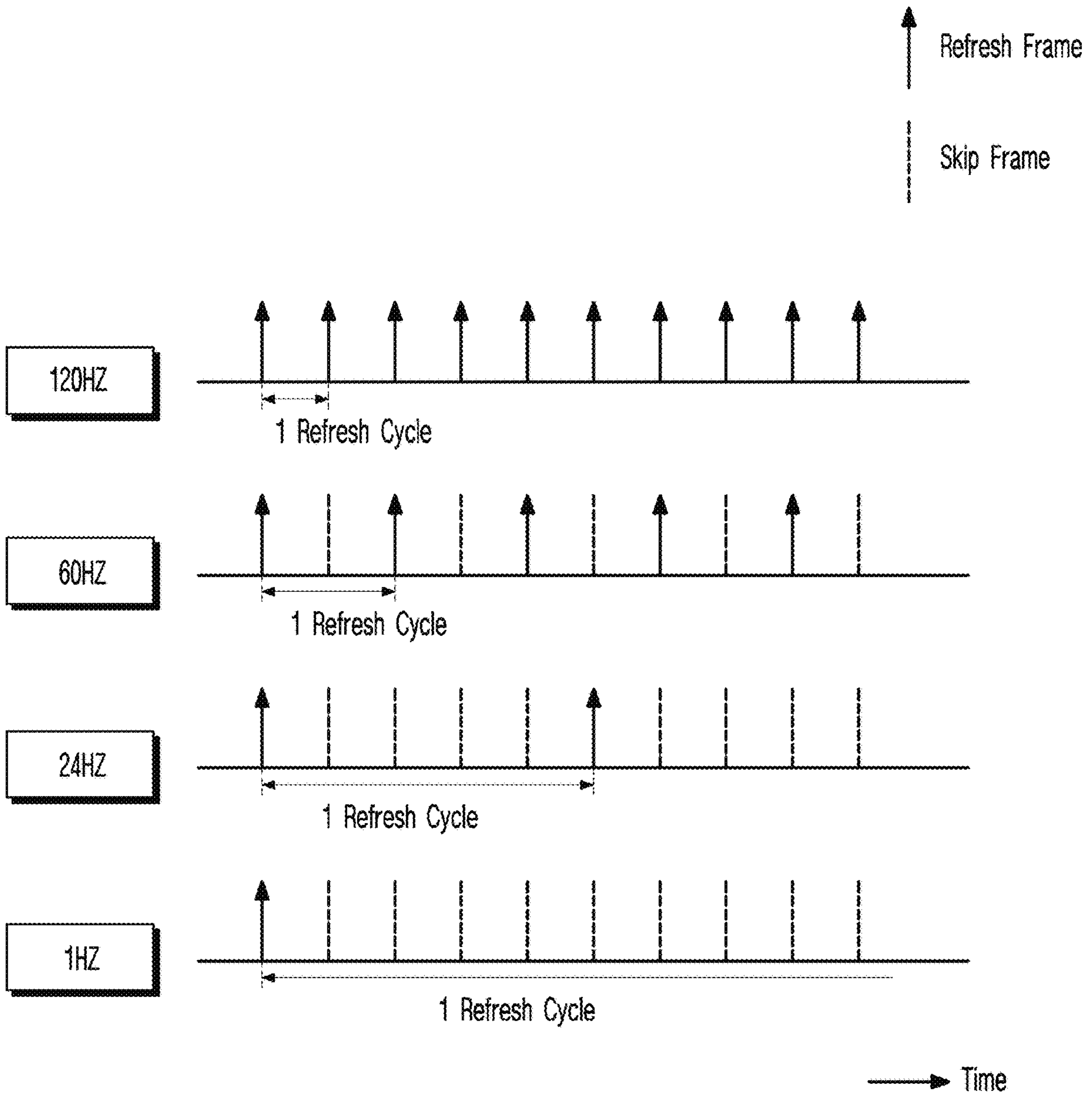
FIG. 2 is a diagram illustrating an example of variable refresh rate (VRR) technology applied to a display device according to an embodiment of the present disclosure.

FIG. 2 is a diagram illustrating an example of VRR technology applied to a display device according to an embodiment of the present disclosure.

Referring to FIG. 2, a data refresh cycle implemented in pixels of a display panel may vary based on an attribute of an input image. The data refresh cycle may get shorter when the amount of variation of an image is large, and when the amount of variation of the image is small, the data refresh cycle may get longer. As the data refresh cycle is longer, low-speed driving may be performed, and as the data refresh cycle is shorter, high-speed driving may be performed.

The data refresh cycle may be 1/frame frequency. For example, the data refresh cycle may be 1 sec/120 in 120 Hz, 1 sec/60 in 60 Hz, 1 sec/24 in 24 Hz, and 1 sec in 1 Hz.

The number of skip frames provided between two adjacent refresh frames may vary based on a frame frequency. For example, the number of skip frames may be 0 in 120 Hz, 1 in 60 Hz, 4 in 24 Hz, and 119 in 1 Hz.

Figure 3:
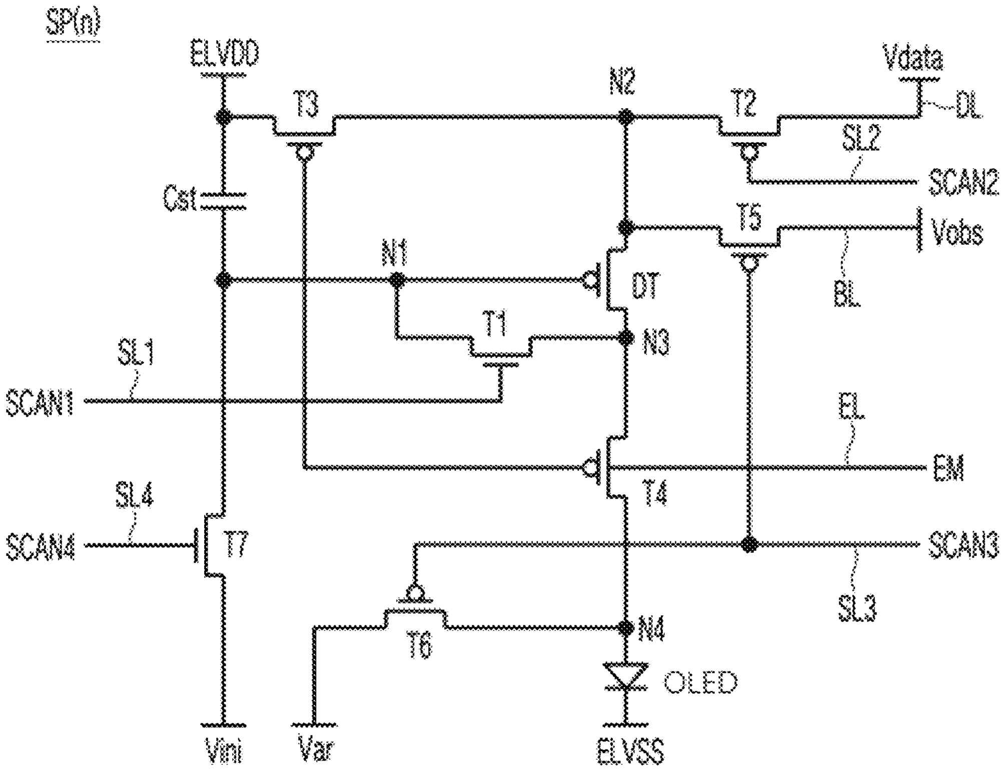
FIG. 3 is a diagram illustrating a pixel according to an embodiment of the present disclosure.

FIG. 3 is a diagram illustrating a pixel SP disposed in an $n^{th}$ pixel row Ln according to an embodiment of the present disclosure.

Referring to FIG. 3, the pixel SP disposed in the $n^{th}$ pixel row Ln may be connected to a source driver through a data line DL. The pixel SP may be connected to a first scan driver of a gate driver through a first scan line SL1, connected to a second scan driver of the gate driver through a second scan line SL2, connected to a third scan driver of the gate driver through a third scan line SL3, and connected to a fourth scan driver of the gate driver through a fourth scan line SL4. The pixel SP may be connected to an EM driver of the gate driver through an emission control line EL.

Referring to FIG. 3, the pixel SP may be implemented with a pixel circuit which includes a light emitting element OLED, a driving transistor DT, a plurality of switch transistors (for example, first to seventh switch transistors) T1 to T7, and a capacitor Cst.

The driving transistor DT, the switch transistors T1 to T7, and the capacitor Cst may control a driving current flowing in the light emitting element OLED. Each of the driving transistor DT and the switch transistors T1 to T7 may include a first electrode, a second electrode, and a gate electrode. One of the first electrode and the second electrode may be a source electrode, and the other of the first electrode and the second electrode may be a drain electrode.

Each of the second to sixth transistors T2 to T6 and the driving transistor DT may be implemented as a PMOS type including a semiconductor layer having LTPS, which is good in response characteristic. On the other hand, the first and seventh transistors T1 and T7 connected to a gate electrode of the driving transistor DT may be implemented as an NMOS type including an oxide semiconductor layer which is good in off characteristic.

An on level voltage of the PMOS-type transistor may be a gate low voltage, and an off level voltage may be a gate high voltage. On the other hand, an on level voltage of the NMOS-type transistor may be a gate high voltage, and an off level voltage may be a gate low voltage.

The light emitting element OLED may include an anode electrode (or a pixel electrode), a cathode electrode (or a common electrode), and an organic compound layer (configured with a common layer and an emission layer) disposed therebetween. The anode electrode of the light emitting element OLED may be connected to a fourth node N4, and the cathode electrode of the light emitting element OLED may be connected to a second power voltage power voltage ELVSS.

The driving transistor DT may include a gate electrode connected to the first node N1, a source electrode connected to a second node N2, and a drain electrode connected to a third node N3. The driving transistor DT may generate the driving current based on a voltage of the first node N1 (or a data voltage stored in the capacitor Cst) and may apply the driving current to the light emitting element OLED.

The first switch transistor T1 may include a gate electrode receiving a first scan signal SCAN1 through a first scan line SL1, a drain electrode connected to the third node N3, and a source electrode connected to the first node N1. The first switch transistor T1 may be turned on in response to the first scan signal SCAN1 and may short-circuit the gate electrode and the drain electrode of the driving transistor DT with each other. Accordingly, the driving transistor DT may operate like a diode while the first switch transistor T1 is being turned on.

The second switch transistor T2 may include a gate electrode receiving a second scan signal SCAN2 through a second scan line SL2, a source electrode connected to a data line (or receiving a data voltage Vdata), and a drain electrode connected to the second node N2. The second switch transistor T2 may be turned on in response to the second scan signal SCAN2 and may transfer the data voltage Vdata to the second node N2.

The capacitor Cst may be connected between the first node N1 and an input terminal of the first power voltage ELVDD. The capacitor Cst may hold a voltage of the first node N1.

The third and fourth switch transistors T3 and T4 may be connected between the first power voltage ELVDD and the light emitting diode OLED and may form a current movement path through which the driving current generated by the driving transistor DT moves.

The third switch transistor T3 may include a source electrode connected to the input terminal of the first power voltage ELVDD, a drain electrode connected to the second node N2, and a gate electrode which receives an emission control signal EM through an emission control line EL. The fourth switch transistor T4 may include a source electrode connected to the third node N3, a drain electrode connected to the fourth node N4, and a gate electrode which receives the emission control signal EM through the emission control line EL.

The third and fourth switch transistors T3 and T4 may be turned on in response to the emission control signal EM. While the third and fourth switch transistors T3 and T4 are being turned on, the light emitting element OLED may receive the driving current from the driving transistor DT and may emit light with brightness corresponding to the driving current.

The fifth switch transistor T5 may include a source electrode connected to an input terminal of an OBS voltage Vobs, a second electrode connected to the second node N2, and a gate electrode which receives a third scan signal SCAN3 through a third scan line SL3. The fifth switch transistor T5 may be turned on based on the third scan signal SCAN3 and may apply the OBS voltage Vobs to the second node N2.

The sixth switch transistor T6 may include a source electrode connected to an input terminal of an anode reset voltage Var, a drain electrode connected to the fourth node N4, and a gate electrode which receives the third scan signal SCAN3 through the third scan line SL3. The sixth switch transistor T6 may be turned on based on the third scan signal SCAN3 and may transfer the anode reset voltage Var to the fourth node N4.

The seventh switch transistor T7 may include a source electrode connected to an input terminal of an initialization voltage Vini, a second electrode connected to the first node N1, and a gate electrode which receives a fourth scan signal SCAN4 through a fourth scan line SL4. The seventh switch transistor T7 may be turned on based on the fourth scan signal SCAN4 and may apply the initialization voltage Vini to the first node N1.

Figure 4:
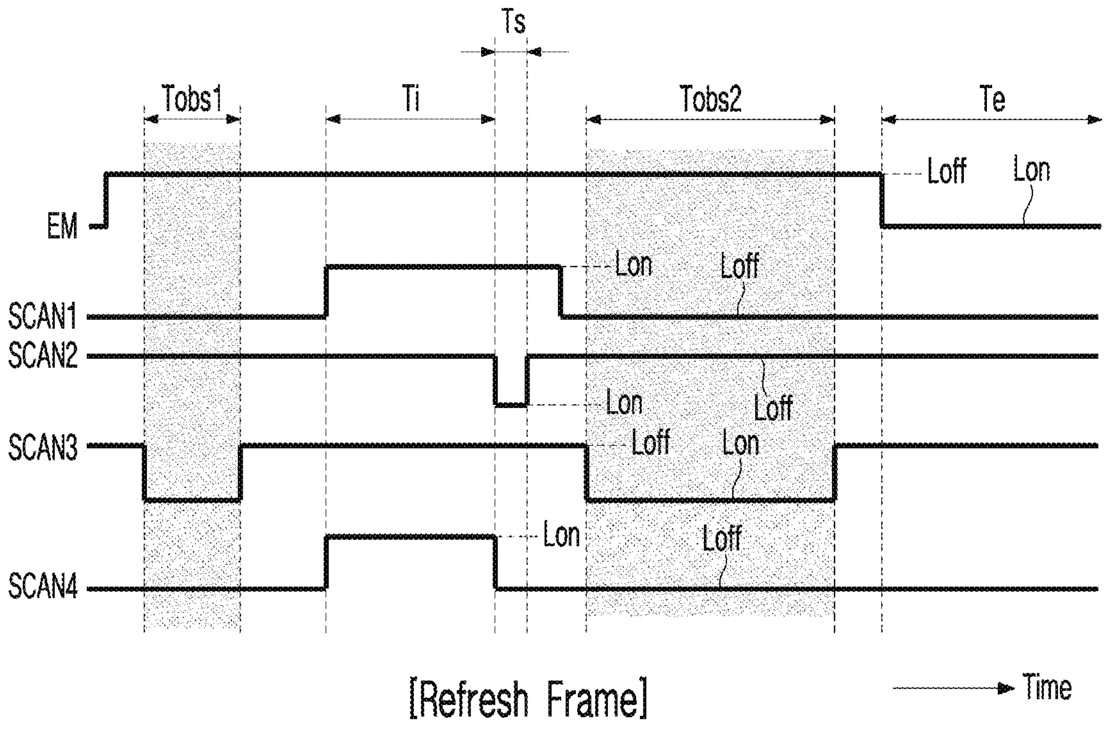
FIG. 4 is a driving waveform diagram of a pixel in a refresh frame.

FIG. 4 is a driving waveform diagram of a pixel in a refresh frame.

Referring to FIG. 4, a first OBS period Tobs1, an initialization period Ti, a programming period Ts, a second OBS period Tobs2, and an emission period Te may be time-serially arranged in the refresh frame.

The second scan signal SCAN2 may define the programming period Ts where a data voltage Vdata is supplied. The programming period Ts may be an on level (Lon) period of a second scan signal SCAN2.

The third scan signal SCAN3 may define a first OBS period Tobs1 preceding the programming period Ts and a second OBS period Tobs2 succeeding the programming period Ts and preceding the emission period Te. The first OBS period Tobs1 and the second OBS period Tobs2 may be an on level (Lon) period of the third scan signal SCAN3.

The fourth scan signal SCAN4 may define an initialization period Ti which is arranged between the first OBS period Tobs1 and the programming period Ts. The initialization period Ti may be an on level (Lon) period of the fourth scan signal SCAN4.

The emission control signal EM may define an emission period Te succeeding the second OBS period Tobs2. The emission period Te may be an on level (Lon) period of the emission control signal EM.

Referring to FIGS. 3 and 4, in the first OBS period Tobs1, in response to the third scan signal SCAN3, the fifth and sixth switch transistors T5 and T6 may be turned on, and the other switch transistors T1 to T4 and T7 may be turned off.

In the first OBS period Tobs1, as the fifth switch transistor T5 is turned on, the OBS voltage Vobs may be applied to the second node N2. Based on the OBS voltage Vobs, a drain-source channel of the driving transistor DT may be maximally opened, and the driving transistor DT may maintain a stronger saturation state, and thus, a hysteresis characteristic of the driving transistor DT may be recovered prior to data programming.

In the first OBS period Tobs1, as the sixth switch transistor T6 is turned on, the anode reset voltage Var may be applied to the fourth node N4. Based on the anode reset voltage Var, residual electric charges charged in a parasitic capacitor formed between the anode electrode and the cathode electrode of the light emitting element OLED may be reset.

Referring to FIGS. 3 and 4, in the initialization period Ti, in response to the first scan signal SCAN1 and the fourth scan signal SCAN4, the first and seventh switch transistors T1 and T7 may be turned on, and the other switch transistors T2 to T6 may be turned off. As the seventh switch transistor T7 is turned on, the first node N1 may be initialized into the initialization voltage Vini, and as the first switch transistor T1 is turned on, the driving transistor DT may operate like a diode.

Referring to FIGS. 3 and 4, in the programming period Ts, as the first and second switch transistors T1 and T2 are turned on, a threshold voltage sampling operation and a data programming operation may be sequentially or simultaneously performed.

The data voltage Vdata may be applied to the second node N2 through the second switch transistor T2. The data voltage Vdata may be applied to the third node N3 through the driving transistor DT, and then, may be applied to the first node N1 through the first switch transistor T1. The driving transistor DT may operate like a diode in a state where the first switch transistor T1 is turned on, an electric potential at the gate electrode of the driving transistor DT connected to the first node N1 may be programmed to be "Vdata−|Vth|". A threshold voltage Vth may be sampled and reflected in a programmed electric potential at the gate electrode of the driving transistor DT.

Referring to FIGS. 3 and 4, in the second OBS period Tobs2, in response to the third scan signal SCAN3, the fifth and sixth switch transistors T5 and T6 may be turned on, and the other switch transistors T1 to T4 and T7 may be turned off.

In the second OBS period Tobs2, as the fifth switch transistor T5 is turned on, the OBS voltage Vobs may be applied to the second node N2. Based on the OBS voltage Vobs, a drain-source channel of the driving transistor DT may be maximally opened, and the driving transistor DT may maintain a stronger saturation state, and thus, a hysteresis characteristic of the driving transistor DT may be re-recovered prior to the emission of light.

In the second OBS period Tobs2, as the sixth switch transistor T6 is turned on, the anode reset voltage Var may be applied to the fourth node N4, and thus, residual electric charges charged in a parasitic capacitor of the light emitting element OLED may be re-reset.

Referring to FIGS. 3 and 4, in the emission period Te, in response to the emission control signal EM, the third and fourth switch transistors T3 and T4 may be turned on, and the other switch transistors T1, T2, T5, T6, and T7 may be turned off.

In the emission period Te, a driving current supplied from the driving transistor DT to the light emitting element OLED may be based on Vgs of the driving transistor DT set in the programming period Ts. The driving current may be irrelevant to a threshold voltage of the driving transistor DT and may be associated with the data voltage Vdata.

Figure 5:
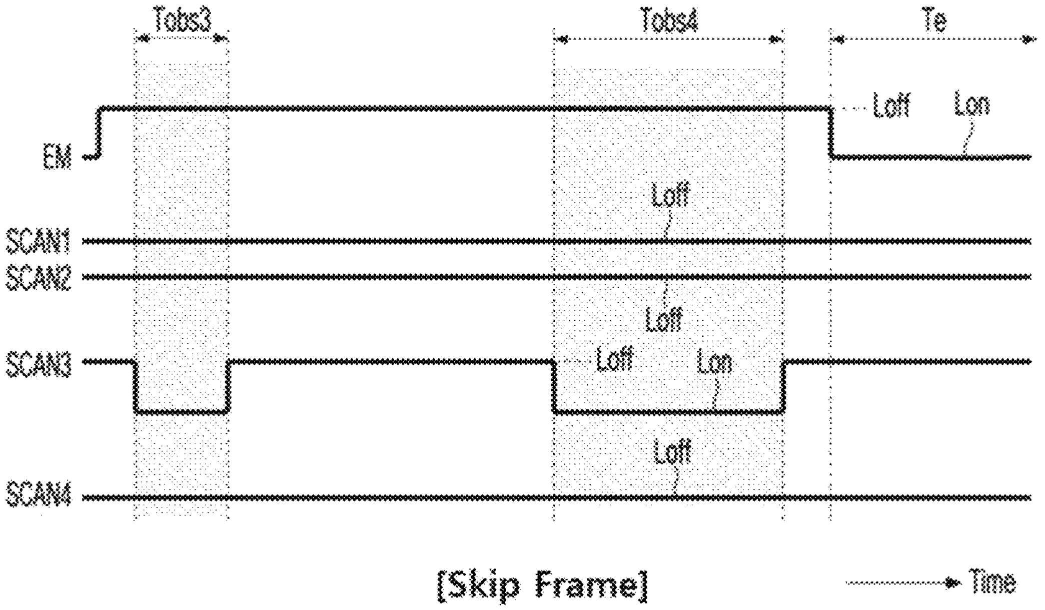
FIG. 5 is a diagram showing a driving waveform of a pixel in a skip frame.

FIG. 5 is a diagram showing a driving waveform of a pixel in a skip frame.

Referring to FIG. 5, a third OBS period Tobs3, a fourth OBS period Tobs4, and an emission period Te may be time-serially arranged in the skip frame.

The emission control signal EM may define the emission period Te of the skip frame. The emission period Te may be an on level (Lon) period of the emission control signal EM. The on level (Lon) period of the emission control signal EM in the skip frame may be substantially the same as the refresh frame.

The third scan signal SCAN3 may define the third OBS period Tobs3 and the fourth OBS period Tobs4 which are sequentially arranged before the emission period Te, in the skip frame. In the skip frame, the third OBS period Tobs3 and the fourth OBS period Tobs4 may be an on level (Lon) period of the third scan signal SCAN3.

Furthermore, the initialization period and the programming period may not be needed in the skip frame.

Referring to FIGS. 3 and 5, a hysteresis characteristic of the driving transistor DT may be again recovered in the third OBS period Tobs3 and the fourth OBS period Tobs4, and thus, a hysteresis characteristic deviation between the skip frame and the refresh frame may be considerably reduced.

The first and second OBS periods Tobs1 and Tobs2 of the refresh frame may be included in an off level (Loff) period of the emission control signal EM, and moreover, the third and fourth OBS periods Tobs3 and Tobs4 of the skip frame may be included in the off level (Loff) period of the emission control signal EM.

A length of the off level (Loff) period of the emission control signal EM may be equal to each other in the refresh frame and the skip frame, and thus, a length of an emission maintenance time may be equal to each other in the refresh frame and the skip frame.

Figure 6:
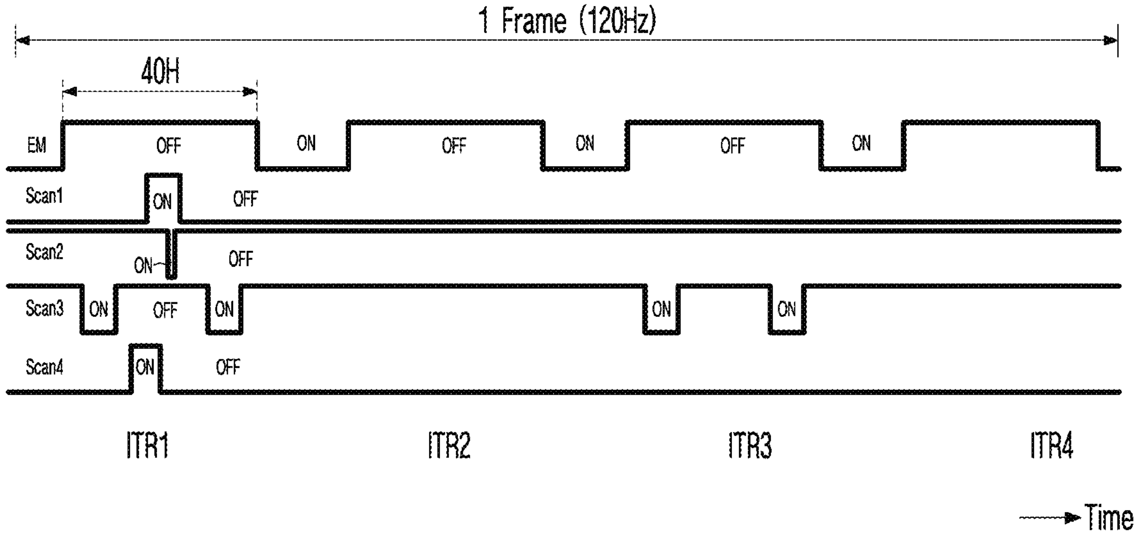
FIGS. 6 and 7 are diagrams illustrating an EM duty driving method based on multi-toggling according to an embodiment of the present disclosure.
Figure 7:
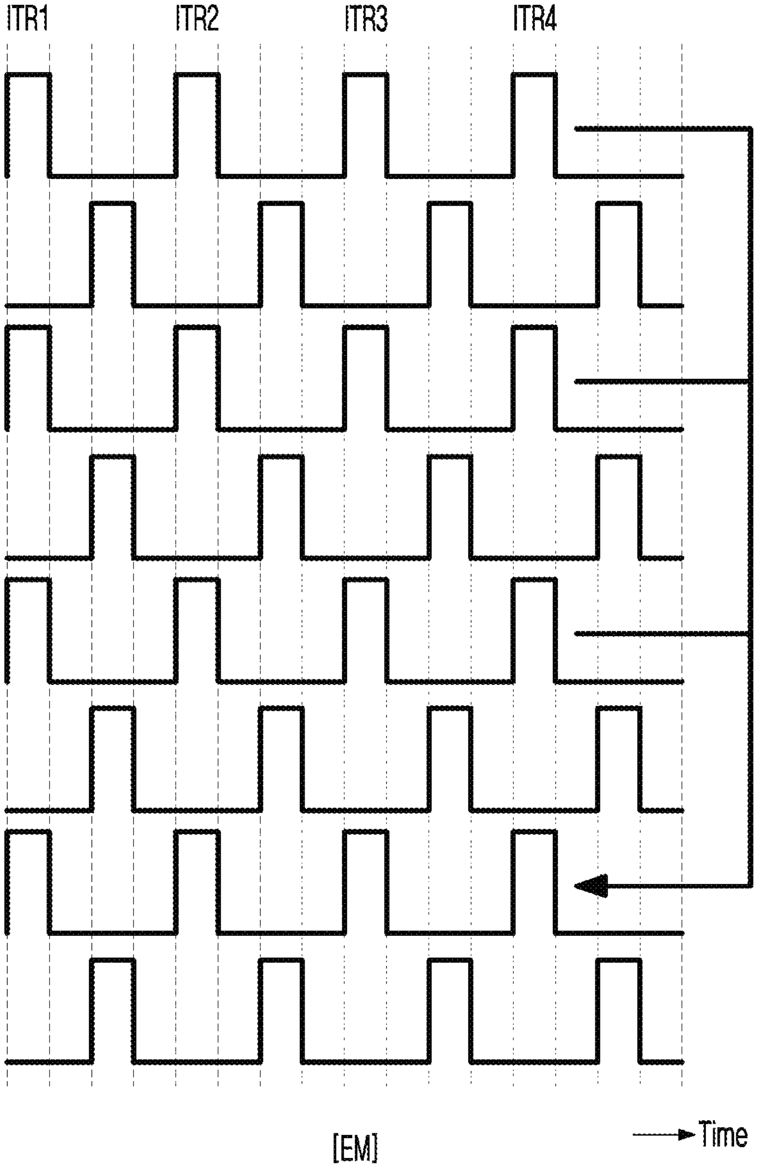

FIGS. 6 and 7 are diagrams illustrating an EM duty driving method based on multi-toggling according to an embodiment of the present disclosure.

Referring to FIGS. 6 and 7, EM duty driving may be based on an emission control signal EM of a multi-pulse type so as to be easily applied to a VRR mode. Multi-toggling may be performed on the emission control signal EM in one frame.

That is, as illustrated in FIGS. 6 and 7, a pulse cycle configuring the emission control signal EM may be repeatedly arranged a plurality of times in one frame. One pulse cycle of the emission control signal EM may include an off period of a first pulse width and an on period of a second pulse width. The off period of the first pulse width may be an EM off period which is repeated four times and is illustrated by ITR1, ITR2, ITR3, and ITR4. The off period of the first pulse width may be described as 40 horizontal period 40H, but is not limited thereto. The off period of the first pulse width and the on period of the second pulse width configuring one pulse cycle may respectively correspond to the off level (Loff) period and the on level (Lon) period of the emission control signal EM illustrated in FIGS. 4 and 5.

Referring to FIGS. 6 and 7, when a frame frequency is 120 Hz, according to an EM duty driving method of four iterations ITR1, ITR2, ITR3, and ITR4, the emission control signal EM may be driven at 480 Hz, and a third scan signal SCAN3 may be driven at 480 Hz. The third scan signal SCAN3 may be turned on twice with a certain time difference in an off period (40 Hz) of ITR1, may be turned on twice with a certain time difference in an off period (40 Hz) of ITR3, and may not be turned on in an off period of each of ITR2 and ITR4.

Referring to FIG. 7, because an EM on-off operation is repeated a plurality of times in one frame, off periods of ITR1, ITR2, ITR3, and ITR4 may overlap each other at a different plurality of positions of a display panel. For example, off periods of ITR4 may overlap each other at four positions of the display panel, and this may be a cause of duty mura as in FIG. 9.

Figure 8:
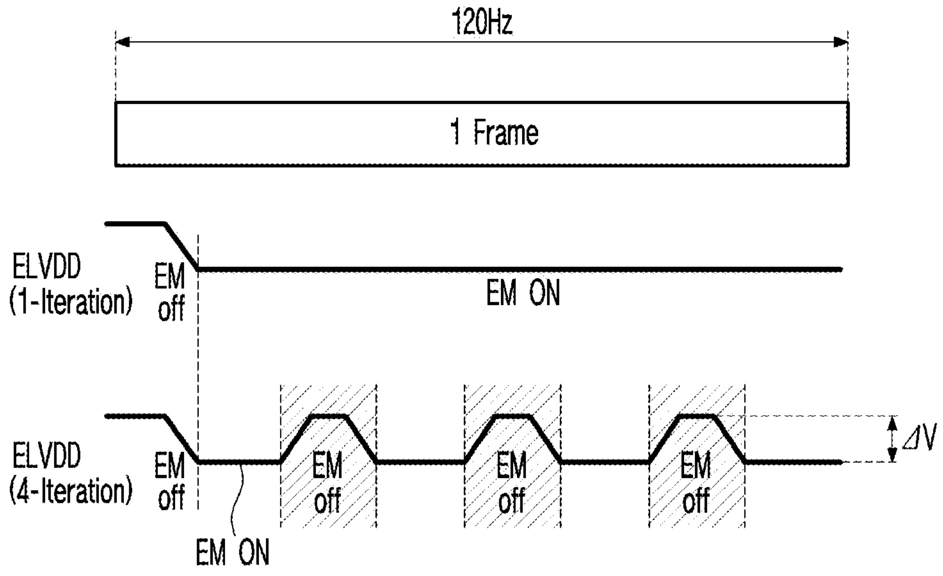
FIG. 8 is a diagram illustrating a variation width of a high-level pixel power in EM off periods.
Figure 9:
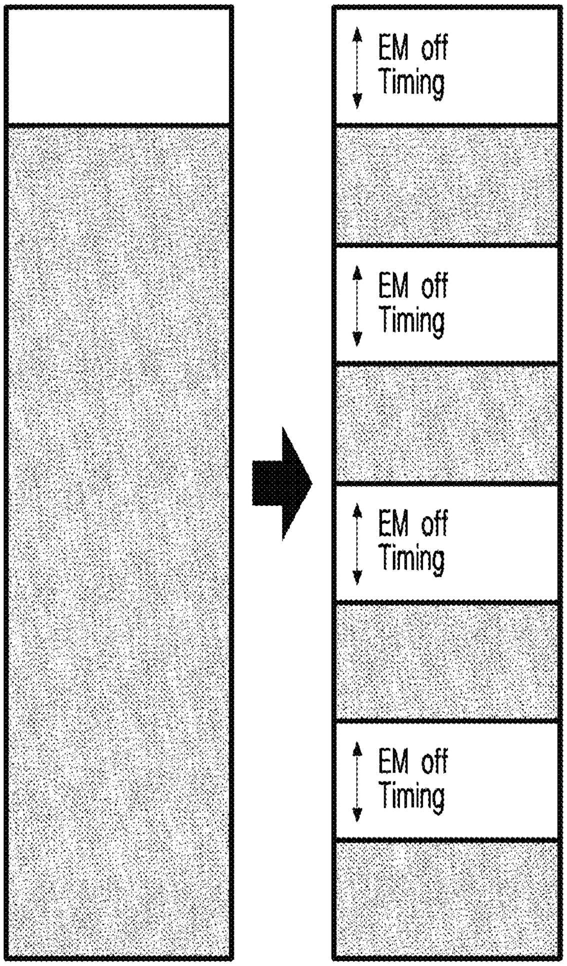
FIG. 9 is a diagram illustrating duty mura occurring in an EM duty driving method based on multi-toggling.

FIG. 8 is a diagram illustrating a variation width of a high-level pixel power in EM off periods. FIG. 9 is a diagram illustrating duty mura occurring in an EM duty driving method based on multi-toggling.

Referring to FIG. 8, according to an EM duty driving method of the present disclosure, because an EM on-off operation is repeated a plurality of times in one frame, a first power voltage ELVDD applied to a pixel may vary a plurality of times in connection thereto. The first power voltage ELVDD may be a high-level pixel power applied to the pixel. The first power voltage ELVDD may maintain a first level in connection with an EM on operation and may up-shift to a second level which is ΔV higher than the first level, in connection with an EM off operation. This may be because a panel load is reduced in an EM off period compared to an EM on period.

In the EM duty driving method based on multi-toggling, undesired duty mura illustrated in FIG. 9 may occur due to a frequent variation of the first power voltage ELVDD in one frame. Duty mura may be a phenomenon where EM off periods overlap each other at different positions of the display panel, and due to this, luminance may be seen to be distorted when performing data programming at a corresponding position. Duty mura may degrade display quality, and thus, a variation width of the first power voltage ELVDD should be reduced in EM off periods in EM duty driving, so as to improve the degradation in display quality.

Hereinafter, various improvement methods for reducing a variation width of the first power voltage ELVDD in EM off periods in EM duty driving will be described.

Figure 10:
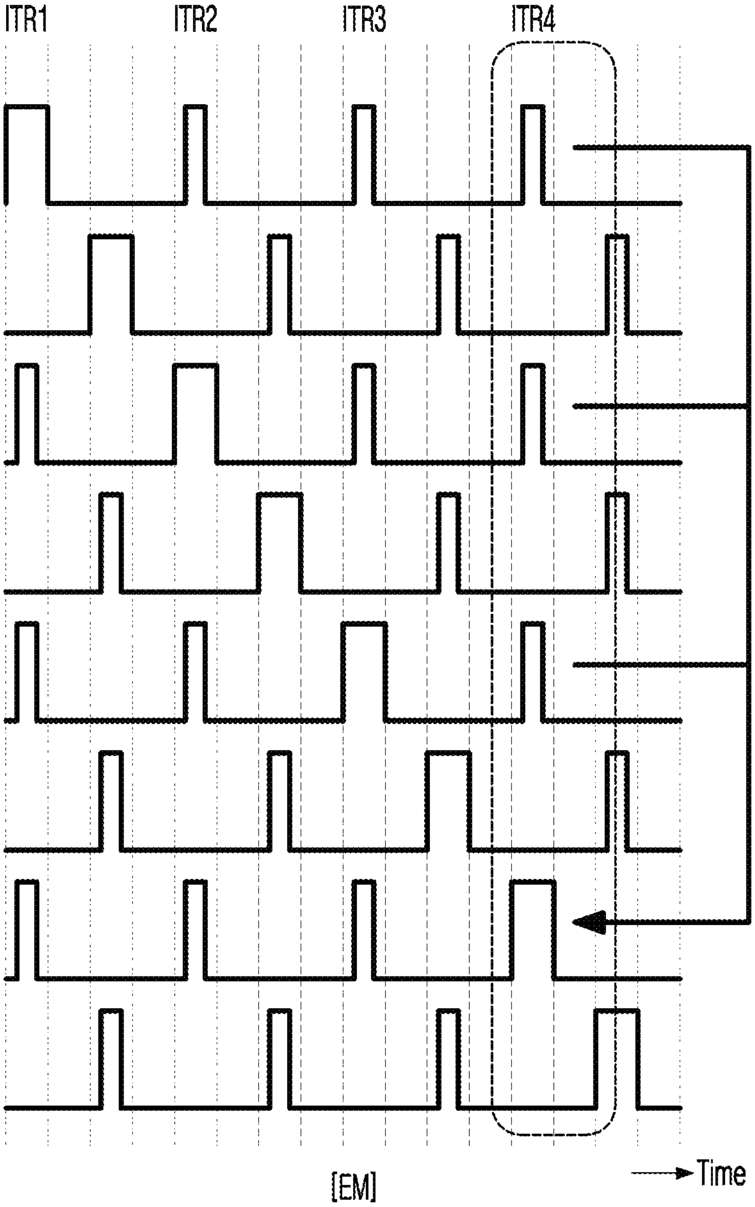
FIG. 10 is a diagram illustrating a first improvement method of an EM duty driving method based on multi-toggling according to an embodiment of the present disclosure.

FIG. 10 is a diagram illustrating a first improvement method of an EM duty driving method based on multi-toggling according to an embodiment of the present disclosure.

Referring to FIG. 10, in order to decrease a variation width of a first power voltage ELVDD in EM off periods, the first improvement method may decrease a time length of each of ITR2, ITR3, and ITR4 compared to a time length of ITR1. Here, the time length of each of ITR2, ITR3, and ITR4 may be equal to one another.

In the following application examples of the first improvement method, one frame may be one of the refresh frame of FIG. 4 and the skip frame of FIG. 5.

Figure 11:
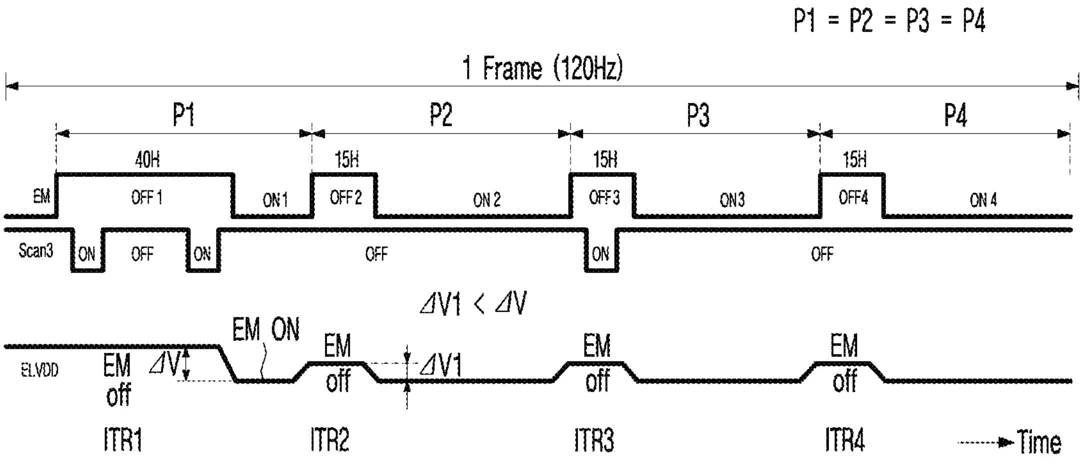
FIG. 11 is a diagram illustrating a first application example of the first improvement method of FIG. 10.

FIG. 11 is a diagram illustrating a first application example of the first improvement method of FIG. 10.

Referring to FIG. 11, a display device according to the first application example may include a display panel, an EM driver, and a scan driver.

At least one pixel may be included in the display panel and may include a driving transistor which generates a driving current and a light emitting element which emits light with the driving current. Each pixel may be supplied with a first power voltage ELVDD from an external power circuit.

The EM driver may generate an emission control signal EM of a multi-pulse type multi-toggled in one frame and may supply the emission control signal EM to the pixel, so as to turn on or off the light-emission of the light emitting element.

The emission control signal EM may include a first pulse cycle P1 and a second pulse cycle P2, which are continued in one frame. Here, a first off period OFF1 of a first pulse width 40H and a first on period ON1 of a second pulse width may be continued in the first pulse cycle P1, and a second off period OFF2 of a third pulse width 15H which is less than the first pulse width 40H and a second on period ON2 of a fourth pulse width which is greater than the second pulse width may be continued in the second pulse cycle P2.

The emission control signal EM may include a third pulse cycle P3 and a fourth pulse cycle P4, which are arranged subsequently to the second pulse cycle P2 in one frame. Here, a third off period OFF3 of the third pulse width 15H and a third on period ON3 of the fourth pulse width may be continued in the third pulse cycle P3, and a fourth off period OFF4 of the third pulse width 15H and a fourth on period ON4 of the fourth pulse width may be continued in the fourth pulse cycle P4.

Each of the first to fourth pulse cycles P1 to P4 may have the same time length in one frame.

The scan driver may generate a scan signal Scan3 which is turned on in at least one off period included in the emission control signal EM, and may supply the scan signal Scan3 to the pixel, so as to apply an OBS voltage to one electrode of the driving transistor and reset the light emitting element.

The scan signal Scan3 may be turned on twice with a certain time difference in the first off period OFF1 of the first pulse cycle P1, may be turned on once in the third off period OFF3 of the third pulse cycle P3, and may be continuously turned off in the second and fourth pulse cycles P2 and P4.

As a result, a variation width of the first power voltage ELVDD may decrease from ΔV to ΔV1 in EM off periods.

Figure 12:
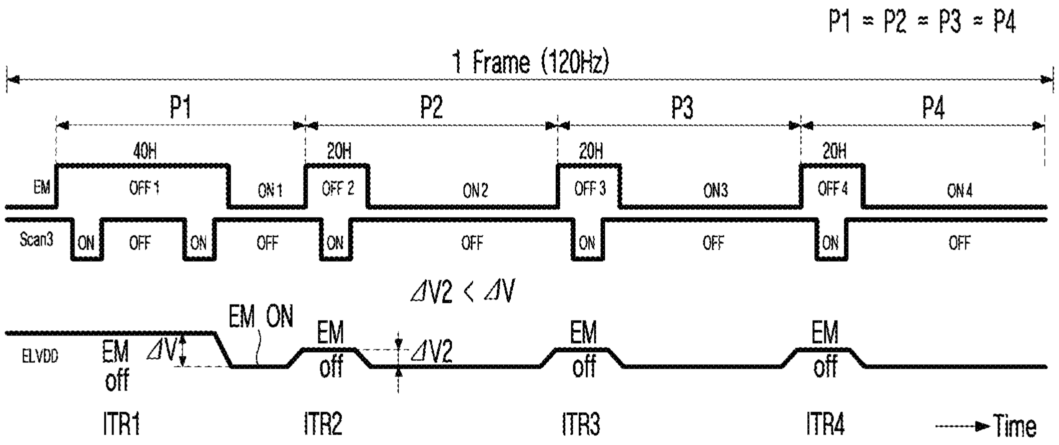
FIG. 12 is a diagram illustrating a second application example of the first improvement method of FIG. 10.

FIG. 12 is a diagram illustrating a second application example of the first improvement method of FIG. 10.

Referring to FIG. 12, a display device according to the second application example may include a display panel, an EM driver, and a scan driver.

At least one pixel may be included in the display panel and may include a driving transistor which generates a driving current and a light emitting element which emits light with the driving current. Each pixel may be supplied with a first power voltage ELVDD from an external power circuit.

The EM driver may generate an emission control signal EM of a multi-pulse type multi-toggled in one frame and may supply the emission control signal EM to the pixel, so as to turn on or off the emission of light by the light emitting element.

The emission control signal EM may include a first pulse cycle P1 and a second pulse cycle P2, which are continued in one frame. Here, a first off period OFF1 of a first pulse width 40H and a first on period ON1 of a second pulse width may be continued in the first pulse cycle P1, and a second off period OFF2 of a third pulse width 20H which is less than the first pulse width 40H and a second on period ON2 of a fourth pulse width which is greater than the second pulse width may be continued in the second pulse cycle P2.

The emission control signal EM may include a third pulse cycle P3 and a fourth pulse cycle P4, which are arranged subsequently to the second pulse cycle P2 in one frame. Here, a third off period OFF3 of the third pulse width 20H and a third on period ON3 of the fourth pulse width may be continued in the third pulse cycle P3, and a fourth off period OFF4 of the third pulse width 20H and a fourth on period ON4 of the fourth pulse width may be continued in the fourth pulse cycle P4.

Each of the first to fourth pulse cycles P1 to P4 may have the same time length in one frame.

The scan driver may generate a scan signal Scan3 which is turned on in at least one off period included in the emission control signal EM, and may supply the scan signal Scan3 to the pixel, so as to apply an OBS voltage to one electrode of the driving transistor and reset the light emitting element.

The scan signal Scan3 may be turned on twice with a certain time difference in the first off period OFF1 of the first pulse cycle P1, may be turned on once in the second off period OFF2 of the second pulse cycle P2, may be turned on once in the third off period OFF3 of the third pulse cycle P3, and may be turned on once in the fourth off period OFF4 of the fourth pulse cycle P4.

As a result, a variation width of the first power voltage ELVDD may decrease from ΔV to ΔV2 in EM off periods.

Comparing with the first application example, the second application example may increase the number of turn-on of the scan signal Scan3, and thus, the number of reset of the light emitting element may increase, thereby easily improving low grayscale luminance uniformity (i.e., improvement of low grayscale smear).

According to the second application example, the emission control signal EM may be driven at 480 Hz, and the third scan signal SCAN3 may be driven at 600 Hz, thereby effectively improving flicker.

Figure 13:
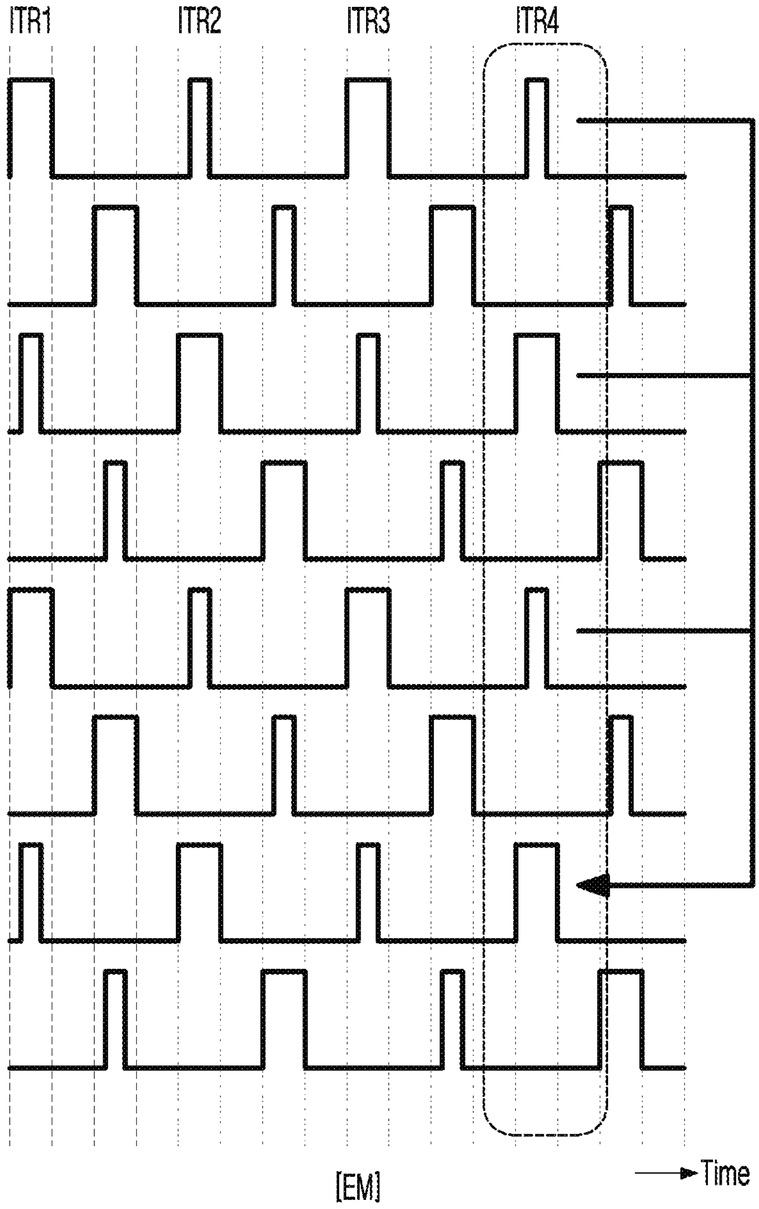
FIG. 13 is a diagram illustrating a second improvement method of an EM duty driving method based on multi-toggling according to an embodiment of the present disclosure.

FIG. 13 is a diagram illustrating a second improvement method of an EM duty driving method based on multi-toggling according to an embodiment of the present disclosure.

Referring to FIG. 13, in order to decrease a variation width of a first power voltage ELVDD in EM off periods, the second improvement method may decrease a time length of each of ITR2 and ITR4 compared to a time length of each of ITR1 and ITR3. Here, the time length of each of ITR1 and ITR3 may be equal to each other, and the time length of each of ITR2 and ITR4 may be equal to each other.

In the following application examples of the second improvement method, one frame may be one of the refresh frame of FIG. 4 and the skip frame of FIG. 5.

Figure 14:
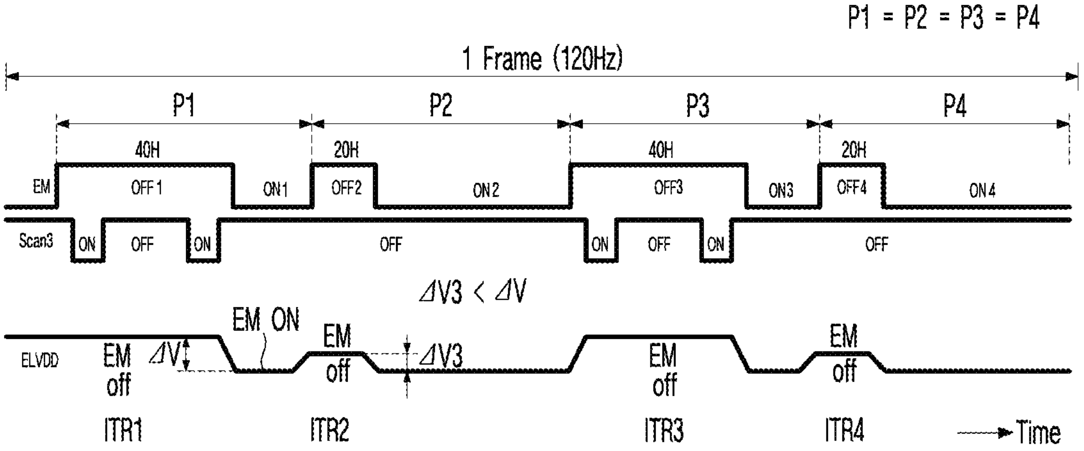
FIG. 14 is a diagram illustrating a first application example of the second improvement method of FIG. 13.

FIG. 14 is a diagram illustrating a first application example of the second improvement method of FIG. 13.

Referring to FIG. 14, a display device according to the first application example may include a display panel, an EM driver, and a scan driver.

At least one pixel may be included in the display panel and may include a driving transistor which generates a driving current and a light emitting element which emits light with the driving current. Each pixel may be supplied with a first power voltage ELVDD from an external power circuit.

The EM driver may generate an emission control signal EM of a multi-pulse type multi-toggled in one frame and may supply the emission control signal EM to the pixel, so as to turn on or off the emission of light by the light emitting element.

The emission control signal EM may include a first pulse cycle P1 and a second pulse cycle P2, which are continued in one frame. Here, a first off period OFF1 of a first pulse width 40H and a first on period ON1 of a second pulse width may be continued in the first pulse cycle P1, and a second off period OFF2 of a third pulse width 20H which is less than the first pulse width 40H and a second on period ON2 of a fourth pulse width which is greater than the second pulse width may be continued in the second pulse cycle P2.

The emission control signal EM may include a third pulse cycle P3 and a fourth pulse cycle P4, which are arranged subsequently to the second pulse cycle P2 in one frame. Here, a third off period OFF3 of the third pulse width and a third on period ON3 of the fourth pulse width may be continued in the third pulse cycle P3, and a fourth off period OFF4 of the third pulse width 40H and a fourth on period ON4 of the fourth pulse width may be continued in the fourth pulse cycle P4.

Each of the first to fourth pulse cycles P1 to P4 may have the same time length in one frame.

The scan driver may generate a scan signal Scan3 which is turned on in at least one off period included in the emission control signal EM, and may supply the scan signal Scan3 to the pixel, so as to apply an OBS voltage to one electrode of the driving transistor and reset the light emitting element.

The scan signal Scan3 may be turned on twice with a certain time difference in the first off period OFF1 of the first pulse cycle P1, may be turned on twice with a certain time difference in the third off period OFF3 of the third pulse cycle P3, and may be continuously turned off in the second and fourth pulse cycles P2 and P4.

As a result, a variation width of the first power voltage ELVDD may decrease from ΔV to ΔV3 in EM off periods.

Moreover, according to the first application example, the emission control signal EM may be driven at 480 Hz, and the third scan signal SCAN3 may be driven at 480 Hz, thereby effectively improving flicker.

Figure 15:
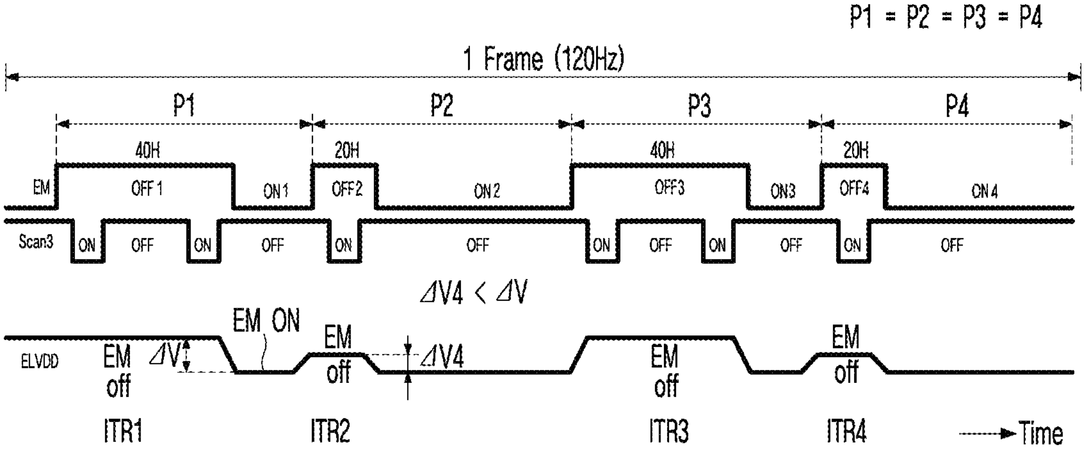
FIG. 15 is a diagram illustrating a second application example of the second improvement method of FIG. 13.

FIG. 15 is a diagram illustrating a second application example of the second improvement method of FIG. 13.

Referring to FIG. 15, a display device according to the second application example may include a display panel, an EM driver, and a scan driver.

At least one pixel may be included in the display panel and may include a driving transistor which generates a driving current and a light emitting element which emits light with the driving current. Each pixel may be supplied with a first power voltage ELVDD from an external power circuit.

The EM driver may generate an emission control signal EM of a multi-pulse type multi-toggled in one frame and may supply the emission control signal EM to the pixel, so as to turn on or off the emission of light by the light emitting element.

The emission control signal EM may include a first pulse cycle P1 and a second pulse cycle P2, which are continued in one frame. Here, a first off period OFF1 of a first pulse width 40H and a first on period ON1 of a second pulse width may be continued in the first pulse cycle P1, and a second off period OFF2 of a third pulse width 20H which is less than the first pulse width 40H and a second on period ON2 of a fourth pulse width which is greater than the second pulse width may be continued in the second pulse cycle P2.

The emission control signal EM may include a third pulse cycle P3 and a fourth pulse cycle P4, which are arranged subsequently to the second pulse cycle P2 in one frame. Here, a third off period OFF3 of the third pulse width 40H and a third on period ON3 of the fourth pulse width may be continued in the third pulse cycle P3, and a fourth off period OFF4 of the third pulse width 20H and a fourth on period ON4 of the fourth pulse width may be continued in the fourth pulse cycle P4.

Each of the first to fourth pulse cycles P1 to P4 may have the same time length in one frame.

The scan driver may generate a scan signal Scan3 which is turned on in at least one off period included in the emission control signal EM, and may supply the scan signal Scan3 to the pixel, so as to apply an OBS voltage to one electrode of the driving transistor and reset the light emitting element.

The scan signal Scan3 may be turned on twice with a certain time difference in the first off period OFF1 of the first pulse cycle P1, may be turned on once in the second off period OFF2 of the second pulse cycle P2, may be turned on twice with a certain time difference in the third off period OFF3 of the third pulse cycle P3, and may be turned on once in the fourth off period OFF4 of the fourth pulse cycle P4.

As a result, a variation width of the first power voltage ELVDD may decrease from ΔV to ΔV4 in EM off periods.

Moreover, according to the second application example, the emission control signal EM may be driven at 480 Hz, and the third scan signal SCAN3 may be driven at 720 Hz, thereby effectively improving flicker.

Comparing with the first application example, the second application example may increase the number of turn-on of the scan signal Scan3, and thus, the number of reset of the light emitting element may increase, thereby easily improving low grayscale smear.

Figure 16:
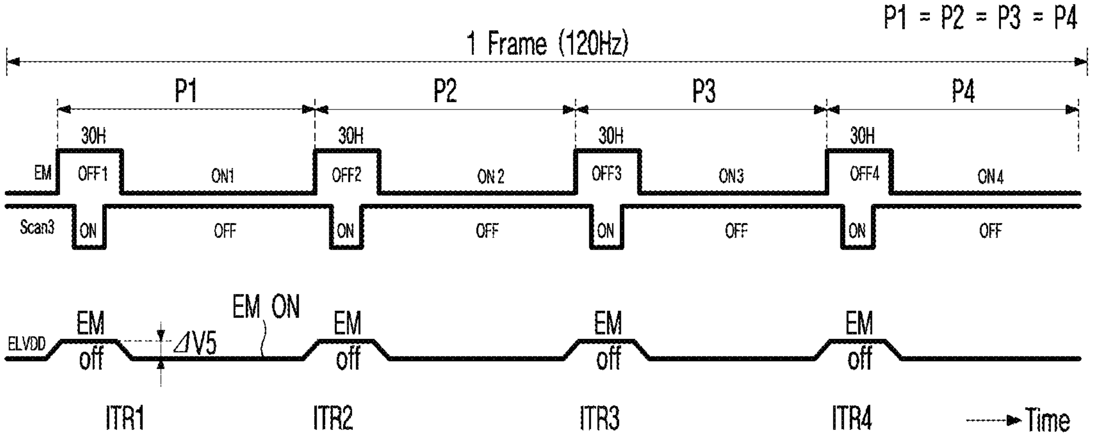
FIG. 16 is a diagram illustrating a third improvement method of an EM duty driving method based on multi-toggling according to an embodiment of the present disclosure.

FIG. 16 is a diagram illustrating a third improvement method of an EM duty driving method based on multi-toggling according to an embodiment of the present disclosure.

Referring to FIG. 16, in order to decrease a variation width of a first power voltage ELVDD in EM off periods, the third improvement method may decrease a time length of each of ITR1, ITR2, ITR3, and ITR4 in pulse cycles configuring one frame. Here, the time length of each of ITR1, ITR2, ITR3, and ITR4 may be equal to one another.

In the following examples of the third improvement method, one frame may be one of the refresh frame of FIG. 4 and the skip frame of FIG. 5.

Referring to FIG. 16, a display device may include a display panel, an EM driver, and a scan driver.

At least one pixel may be included in the display panel and may include a driving transistor which generates a driving current and a light emitting element which emits light with the driving current. Each pixel may be supplied with a first power voltage ELVDD from an external power circuit.

The EM driver may generate an emission control signal EM of a multi-pulse type multi-toggled in one frame and may supply the emission control signal EM to the pixel, so as to turn on or off the emission of light by the light emitting element.

The emission control signal EM may include a first pulse cycle P1 and a second pulse cycle P2, which are continued in one frame. Here, a first off period OFF1 of a first pulse width 30H and a first on period ON1 of a second pulse width may be continued in the first pulse cycle P1, and a second off period OFF2 of the first pulse width 30H and a second on period ON2 of the second pulse width may be continued in the second pulse cycle P2. It may be characterized that the first pulse width 30H is less than the second pulse width.

The emission control signal EM may include a third pulse cycle P3 and a fourth pulse cycle P4, which are arranged subsequently to the second pulse cycle P2 in one frame. Here, a third off period OFF3 of the first pulse width 30H and a third on period ON3 of the second pulse width may be continued in the third pulse cycle P3, and a fourth off period OFF4 of the first pulse width 30H and a fourth on period ON4 of the second pulse width may be continued in the fourth pulse cycle P4.

Each of the first to fourth pulse cycles P1 to P4 may have the same time length in one frame.

The scan driver may generate a scan signal Scan3 which is turned on in at least one off period included in the emission control signal EM, and may supply the scan signal Scan3 to the pixel, so as to apply an OBS voltage to one electrode of the driving transistor and reset the light emitting element.

The scan signal Scan3 may be turned on once in the first off period OFF1 of the first pulse cycle P1, may be turned on once in the second off period OFF2 of the second pulse cycle P2, may be turned on once in the third off period OFF3 of the third pulse cycle P3, and may be turned on once in the fourth off period OFF4 of the fourth pulse cycle P4.

As a result, a variation width of the first power voltage ELVDD may decrease from ΔV to ΔV5 in EM off periods.

According to the third improvement method, the number of turn-on of the scan signal Scan3 may increase, and thus, the number of reset of the light emitting element may increase, thereby easily improving low grayscale smear.

Moreover, according to the third improvement method, the emission control signal EM may be driven at 480 Hz, and the third scan signal SCAN3 may be driven at 480 Hz, thereby effectively improving flicker.

Figure 17:
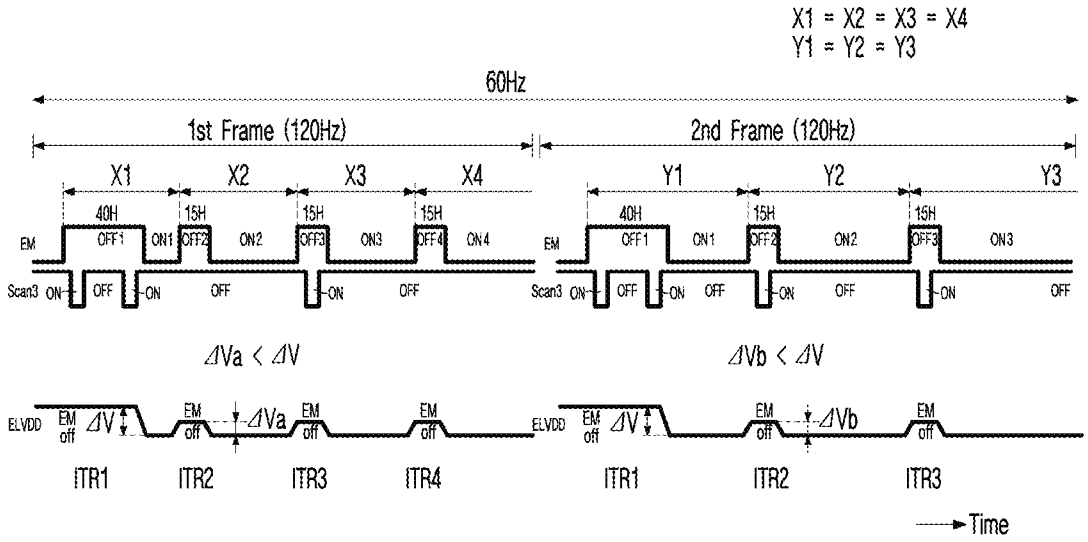
FIG. 17 is a diagram illustrating a fourth improvement method of an EM duty driving method based on multi-toggling according to an embodiment of the present disclosure.

FIG. 17 is a diagram illustrating a fourth improvement method of an EM duty driving method based on multi-toggling according to an embodiment of the present disclosure.

Referring to FIG. 17, in order to decrease a variation width of a first power voltage ELVDD in EM off periods, the fourth improvement method may be implemented so that the number of iterations and a time length of an EM pulse cycle differ in a first frame and a second frame which are continued. Accordingly, luminance variation positions may be dispersed for each frame, and thus, sum duty mura may be improved.

Referring to FIG. 17, a display device may include a display panel, an EM driver, and a scan driver.

At least one pixel may be included in the display panel and may include a driving transistor which generates a driving current and a light emitting element which emits light with the driving current. Each pixel may be supplied with a first power voltage ELVDD from an external power circuit.

The EM driver may generate an emission control signal EM of a multi-pulse type multi-toggled in one frame and may supply the emission control signal EM to the pixel, so as to turn on or off the emission of light by the light emitting element.

The emission control signal EM may include K (where K may be a natural number) of X pulse cycles X1 to X4 having a first length during a first frame and may include J (where J may be a natural number of less than K) of Y pulse cycles Y1 to Y3 having a second length differing from the first length during a second frame succeeding the first frame.

The X pulse cycles included in the first frame may include first to fourth X pulse cycles X1 to X4 each having the first length.

A first off period OFF1 of a first pulse width 40H and a first on period ON1 of a second pulse width may be continued in the first X pulse cycle X1, and a second off period OFF2 of a third pulse width 15H which is less than the first pulse width 40H and a second on period ON2 of a fourth pulse width which is greater than the second pulse width may be continued in the second X pulse cycle X2.

A third off period OFF3 of the third pulse width 15H and a third on period ON3 of the fourth pulse width may be continued in the third X pulse cycle X3, and a fourth off period OFF4 of the third pulse width 15H and a fourth on period ON4 of the fourth pulse width may be continued in the fourth X pulse cycle X4.

The Y pulse cycles included in the second frame may include first to third Y pulse cycles Y1 to Y3 each having the second length.

The first off period OFF1 of the first pulse width 40H and the first on period ON1 of a fifth pulse width may be continued in the first Y pulse cycle Y1, the second off period OFF2 of the third pulse width 15H which is less than the first pulse width 40H and the second on period ON2 of a sixth pulse width which is greater than the second pulse width may be continued in the second Y pulse cycle Y2, and the third off period OFF3 of the third pulse width 15H and the third on period ON3 of the sixth pulse width may be continued in the third Y pulse cycle Y3.

The scan driver may generate a scan signal Scan3 which is turned on in at least one off period included in the emission control signal EM, and may supply the scan signal Scan3 to the pixel, so as to apply an OBS voltage to one electrode of the driving transistor and reset the light emitting element.

During the first frame, the scan signal Scan3 may be turned on twice with a certain time difference in the first off period OFF1 of the first X pulse cycle X1, may be turned on once in the third off period OFF3 of the third X pulse cycle X3, and may be turned off in the second off period OFF2 of the second X pulse cycle X2 and the fourth off period OFF4 of the fourth X pulse cycle X4.

As a result, a variation width of the first power voltage ELVDD may decrease from ΔV to ΔVa in EM off periods of the first frame.

Moreover, during the second frame, the scan signal Scan3 may be turned on twice with a certain time difference in the first off period OFF1 of the first Y pulse cycle Y1, may be turned on once in the second off period OFF2 of the second Y pulse cycle Y2, and may be turned on once in the third off period OFF3 of the third Y pulse cycle Y3.

As a result, a variation width of the first power voltage ELVDD may decrease from ΔV to ΔVb in EM off periods of the second frame.

The present disclosure may realize the following effects.

The present disclosure may decrease a variation width of a high-level pixel power in EM off periods when performing EM duty driving and may thus increase image quality The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure including the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including at least one pixel including a driving transistor configured to generate a driving current and a light emitting element configured to emit light with the driving current;

an EM driver configured to generate an emission control signal and supply the emission control signal to the at least one pixel, so as to turn on or off light-emission of the light emitting element, one frame of the emission control signal including multiple pulses; and a scan driver configured to generate a scan signal that is turned on in at least one off period included in the emission control signal, and supply the scan signal to the at least one pixel, so as to apply an on-bias stress (OBS) voltage to an electrode of the driving transistor and reset the light emitting element, wherein the emission control signal comprises a first pulse cycle, a second pulse cycle, a third pulse cycle and a four pulse cycle in order in the one frame, a first off period of a first pulse width and a first on period of a second pulse width are included in the first pulse cycle, a second off period of a third pulse width which is less than the first pulse width and a second on period of a fourth pulse width which is greater than the second pulse width are included in the second pulse cycle, a third off period and a third on period are included in the third pulse cycle, and a fourth off period and a fourth on period are included in the fourth pulse cycle, and wherein the scan signal is turned on twice with a time difference in the first off period of the first pulse cycle.

2. The display device of claim 1, wherein the third off period of the third pulse width and the third on period of the fourth pulse width are included in the third pulse cycle, the fourth off period of the third pulse width and the fourth on period of the fourth pulse width are included in the fourth pulse cycle, and the first, second, third, and fourth pulse cycles are equal to one another in length.

3. The display device of claim 2, wherein the scan signal is turned on once in the third off period of the third pulse cycle, and continuously turned off in the second and fourth pulse cycles.

4. The display device of claim 2, wherein the scan signal is turned on once in the second off period of the second pulse cycle, turned on once in the third off period of the third pulse cycle, and turned on once in the fourth off period of the fourth pulse cycle.

5. The display device of claim 1, wherein the third off period of the first pulse width and the third on period of the second pulse width are included in the third pulse cycle, the fourth off period of the third pulse width and the fourth on period of the fourth pulse width are included in the fourth pulse cycle, and the first, second, third, and fourth pulse cycles are equal to one another in length.

6. The display device of claim 5, wherein the scan signal is turned on twice with a time difference in the third off period of the third pulse cycle, and continuously turned off in the second and fourth pulse cycles.

7. The display device of claim 5, wherein the scan signal is turned on once in the second off period of the second pulse cycle, turned on twice with a time difference in the third off period of the third pulse cycle, and turned on once in the fourth off period of the fourth pulse cycle.

8. The display device of claim 1, wherein the one frame is one of a refresh frame where a data voltage is supplied to the at least one pixel or a skip frame where the supply of the data voltage to the at least one pixel stops.

9. A display device comprising:

a display panel including at least one pixel including a driving transistor configured to generate a driving current and a light emitting element configured to emit light with the driving current;

an EM driver configured to generate an emission control signal and supply the emission control signal to the at least one pixel, so as to turn on or off light-emission of the light emitting element, one frame of the emission control signal including multiple pulses; and a scan driver configured to generate a scan signal that is turned on in at least one off period included in the emission control signal, and supply the scan signal to the at least one pixel, so as to apply an on-bias stress (OBS) voltage to one electrode of the driving transistor and reset the light emitting element, wherein the emission control signal comprises a first pulse cycle and a second pulse cycle, a third pulse cycle and a four pulse cycle in order in the one frame, a first off period of a first pulse width and a first on period of a second pulse width are included in the first pulse cycle, a second off period of the first pulse width and a second on period of the second pulse width are included in the second pulse cycle, a third off period of the first pulse width and a third on period of the second pulse width are included in the third pulse cycle, and a fourth off period of the first pulse width and a fourth on period of the second pulse width are included in the fourth pulse cycle, the first, second, third, and fourth pulse cycles are equal to one another in length, and the first pulse width is less than the second pulse width.

10. The display device of claim 9, wherein the scan signal is turned on once in the first off period of the first pulse cycle, turned on once in the second off period of the second pulse cycle, turned on once in the third off period of the third pulse cycle, and turned on once in the fourth off period of the fourth pulse cycle.

11. The display device of claim 9, wherein the one frame is one of a refresh frame where a data voltage is supplied to the at least one pixel or a skip frame where the supply of the data voltage to the at least one pixel stops.

12. A display device comprising:

a display panel including at least one pixel including a driving transistor configured to generate a driving current and a light emitting element configured to emit light with the driving current;

an EM driver configured to generate an emission control signal and supply the emission control signal to the at least one pixel, so as to turn on or off light-emission of the light emitting element, one frame of the emission control signal including multiple pulses; and a scan driver configured to generate a scan signal that is turned on in at least one off period included in the emission control signal, and supply the scan signal to the at least one pixel, so as to apply an on-bias stress (OBS) voltage to an electrode of the driving transistor and reset the light emitting element, wherein the emission control signal comprises K (where K is a natural number) of X pulse cycles each having a first length during a first frame, and J (where J is a natural number of less than K) of Y pulse cycles each having a second length differing from the first length during a second frame succeeding the first frame.

13. The display device of claim 12, wherein the X pulse cycles each comprise first to fourth X pulse cycles having the first length, a first off period of a first pulse width and a first on period of a second pulse width are included in the first X pulse cycle, a second off period of a third pulse width which is less than the first pulse width and a second on period of a fourth pulse width which is greater than the second pulse width are included in the second X pulse cycle, a third off period of the third pulse width and a third on period of the fourth pulse width are included in the third X pulse cycle, and a fourth off period of the third pulse width and a fourth on period of the fourth pulse width are included in the fourth X pulse cycle.

14. The display device of claim 13, wherein the scan signal is turned on twice with a time difference in the first off period of the first X pulse cycle, turned on once in the third off period of the third X pulse cycle, and continuously turned off in the second and fourth X pulse cycles.

15. The display device of claim 12, wherein the Y pulse cycles each comprise first to third Y pulse cycles having the second length, a first off period of a first pulse width and a first on period of a second pulse width are included in the first Y pulse cycle, a second off period of a third pulse width which is less than the first pulse width and a second on period of a fourth pulse width which is greater than the second pulse width are included in the second Y pulse cycle, and a third off period of the third pulse width and a third on period of the fourth pulse width are included in the third Y pulse cycle.

16. The display device of claim 15, wherein the scan signal is turned on twice with a time difference in the first off period of the first Y pulse cycle, turned on once in the second off period of the second Y pulse cycle, and turned on once in the third off period of the third Y pulse cycle.

17. The display device of claim 12, wherein each of the first and second frames is one of a refresh frame where a data voltage is supplied to the at least one pixel or a skip frame where the supply of the data voltage to the at least one pixel stops.

* * * * *